(12) United States Patent
Kuo et al.

(10) Patent No.: US 12,507,232 B2
(45) Date of Patent: Dec. 23, 2025

(54) CRITERIA-BASED RETRANSMISSION GRANTS FOR PENDING MEDIA ACCESS CONTROL PROTOCOL DATA UNITS

(71) Applicant: Nokia Technologies Oy, Espoo (FI)

(72) Inventors: Ping-Heng Kuo, London (GB); Matha Deghel, Montrouge (FR)

(73) Assignee: Nokia Technologies Oy, Espoo (FI)

( * ) Notice: Subject to any disclaimer, the term of this patent is extended or adjusted under 35 U.S.C. 154(b) by 336 days.

(21) Appl. No.: 18/006,771

(22) PCT Filed: Jul. 27, 2020

(86) PCT No.: PCT/EP2020/071072
§ 371 (c)(1),
(2) Date: Jan. 25, 2023

(87) PCT Pub. No.: WO2022/022798
PCT Pub. Date: Feb. 3, 2022

(65) Prior Publication Data
US 2023/0262682 A1    Aug. 17, 2023

(51) Int. Cl.
*H04W 72/00* (2023.01)
*H04W 72/1263* (2023.01)
(Continued)

(52) U.S. Cl.
CPC ..... *H04W 72/1263* (2013.01); *H04W 72/566* (2023.01); *H04W 80/02* (2013.01)

(58) Field of Classification Search
CPC ........... H04W 72/1263; H04W 72/566; H04W 80/02; H04W 72/23; H04W 72/21
See application file for complete search history.

(56) References Cited

U.S. PATENT DOCUMENTS

| 2021/0250989 A1* | 8/2021 | Chin | H04W 76/27 |
| 2023/0088550 A1* | 3/2023 | Wang | H04L 1/1822 370/329 |

OTHER PUBLICATIONS

CATT (Handling of Dropped MAC PDU, R2 1914412, Nov. 18, 2019).*

(Continued)

*Primary Examiner* — Lakeram Jangbahadur
(74) *Attorney, Agent, or Firm* — Lippes Mathias LLP

(57) ABSTRACT

The present disclosure relates generally to the field of wireless communications and, in particular, to techniques for issuing criteria-based retransmission grants for pending Media Access Control (MAC) Protocol Data Units (PDUs) generated and buffered in a user equipment (UE) in a wireless communication network. In particular, the UE is configured with at least one criterion for determining which of the pending MAC PDUs stored in the UE (e.g., in the HARQ buffers) could be transmitted by using radio resources of a retransmission grant issued by a network node. In other words, the UE should determine whether at least one of the pending MAC PDUs meets the at least one criterion. The at least one criterion may be signalled to the UE either in the retransmission grant or independently from the retransmission grant. If none of the pending MAC PDUs meets the at least one criterion, it is also allowed to apply the at least one criterion to a new MAC PDU, thereby making it possible to use the retransmission grant issued by the network node as a new transmission grant (provided that the new MAC PDU meets the at least one criterion). Thus, by using such a retransmission grant, it is possible to provide efficient MAC PDU recovery and resource usage.

12 Claims, 6 Drawing Sheets

(51) Int. Cl.
    *H04W 72/566*     (2023.01)
    *H04W 80/02*     (2009.01)

(56) References Cited

OTHER PUBLICATIONS

Huawei (Remaining issues on Configured Grant, R2 2001033. Mar. 6, 2020).*
Oppo et al ("Issues on ignoring the received UL grant for deprioritized PDU", R2-1915096, Nov. 22, 2019).*
"Transmission of Deprioritized Data by Retransmission Grant", 3GPP TSG-RAN2 Meeting #109-e, R2-2001495, Agenda: 6.7.3.1, Samsung, Feb. 24-Mar. 6, 2020, 4 pages.
"HARQ retransmissions for deprioritized PDU with empty HARQ buffer", 3GPP TSG-RAN WG2 Meeting #109 electronic, R2-2000825, Agenda: 6.7.3.1, Sony, Feb. 24-Mar. 6, 2020, 3 pages.
"IEEE 802.11", Wikipedia, Retrieved on Feb. 6, 2023, Webpage available at : https://en.wikipedia.org/wiki/IEEE_802.11.
International Search Report and Written Opinion received for corresponding Patent Cooperation Treaty Application No. PCT/EP2020/071072, dated Apr. 20, 2021, 12 pages.
"Handling of Dropped MAC PDU", 3GPP TSG-RAN WG2 Meeting #108, R2-1914412, Agenda: 6.7.3.1, CATT, Nov. 18-22, 2019, 6 pages.
"Remaining issues on Configured Grant", 3GPP TSG-RAN WG2 Meeting #109 electronic, R2-2001033, Agenda: 6.7.3.1, Huawei, Feb. 24-Mar. 6, 2020, 5 pages.
"Issues on ignoring the received UL grant for deprioritized PDU", 3GPP TSG-RAN WG2 Meeting #108, R2-1915096, Agenda: 6.7.3.1, Oppo, Nov. 18-22, 2019, pp. 1-3.

\* cited by examiner

CRITERIA-BASED RETRANSMISSION GRANTS FOR PENDING MEDIA ACCESS CONTROL PROTOCOL DATA UNITS

RELATED APPLICATION

This application claims priority to PCT Application No. PCT/EP2020/071072, filed on Jul. 27, 2020, each of which is incorporated herein by reference in its entirety.

TECHNICAL FIELD

The present disclosure relates generally to the field of wireless communications and, in particular, to techniques for issuing criteria-based retransmission grants for pending Media Access Control (MAC) Protocol Data Units (PDUs) generated and buffered in a user equipment (UE) in a wireless communication network.

BACKGROUND

In a wireless communication network, there may be scenarios where at least two uplink grants for MAC PDUs of the same or at least two UEs have their uplink resources at least partially overlapping or colliding in time, and/or scenarios where uplink resources of at least one uplink grant for a MAC PDU overlap at least partially with Physical Uplink Control Channel (PUCCH) resources for control signal transmission in time. In such scenarios, it is required to define prioritization rules for the colliding uplink grants to ensure that more urgent data (e.g., relating to Ultra-Reliable Low-Latency Communications (URLLC) services) may be delivered more rapidly than other data (e.g., relating to Enhanced Mobile Broadband (eMBB) services). This topic may be referred to as intra-UE prioritization or inter-UE prioritization, depending on whether the colliding uplink grants belong to the same UE or different UEs. The prioritization rules may, for example, be based on the comparison of priorities of Logical Channels (LCHs) that are (or may be) mapped to the uplink grants with the colliding resources, and the uplink grant corresponding to a higher-priority MAC PDU should be prioritized, while the remaining uplink grants should be deprioritized and the corresponding MAC PDUs become pending if they are already generated.

According to the current state-of-the-art, depending on whether a deprioritization decision is made before or after a corresponding MAC PDU is generated in a UE, there are two possible cases for a deprioritized uplink grant: (a) the MAC PDU of the deprioritized uplink grant has already been generated and buffered in a corresponding Hybrid Automatic Repeat Request (HARQ) buffer, or (b) the MAC PDU of the deprioritized grant has not been generated. In case (a), the MAC PDU may be recovered by using a retransmission grant issued from a network node. In case (b), the MAC PDU of the deprioritized uplink grant will be not generated.

However, the existing procedures for issuing retransmission grants are not efficient in terms of uplink resource usage and MAC PDU recovery, which may degrade data delivery performance. Moreover, the network node may not be aware if the MAC PDU corresponding to the deprioritized uplink grant has already been generated or not. This creates an ambiguity at the network node, i.e. the network node does not know whether to issue the retransmission grant (which is suitable if the corresponding MAC PDU has been generated) or a new transmission grant. This is particularly true when the deprioritized uplink grant is a configured grant, as the network node could assume that the configured grant has been skipped by the UE.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an objective of the present disclosure to provide a technical solution that enables issuing criteria-based retransmission grants for pending MAC PDUs generated and buffered in UEs.

The objective above is achieved by the features of the independent claims in the appended claims. Further embodiments and examples are apparent from the dependent claims, the detailed description and the accompanying drawings.

According to a first aspect, a network node in a wireless communication network is provided. The network node comprises a processor, a memory coupled to the processor and configured to store processor-executable instructions, and a transceiver coupled to the processor. When executed, the processor-executable instructions cause the operation of the processor. More specifically, the processor generates configuration information for a UE in the wireless communication network. The configuration information comprises at least one criterion for determining whether pending Media Access Control (MAC) Protocol Data Units (PDUs) in the UE comprise a target MAC PDU. The processor further generates a retransmission grant for the UE. The retransmission grant comprises information regarding radio resources to be used by the UE to transmit the target MAC PDU. After that, the processor causes the transceiver to transmit the configuration information and the retransmission grant to the UE. By using such configuration information, the network node may configure the UE to use the at least one criterion in order to determine which of the pending MAC PDUs stored in the UE (e.g., in a HARQ buffer) could be sent using the radio resources of the retransmission grant, thereby providing efficient MAC PDU recovery and resource usage.

In one example embodiment of the first aspect, the at least one criterion comprises at least one of the following:
the target MAC PDU should convey data with the highest or lowest priority;
the target MAC PDU should convey data with priority higher or lower than a priority threshold;
the target MAC PDU should convey data from a Logical Channel (LCH) having predefined parameters in certain value ranges;
the target MAC PDU should convey data from at least one predefined LCH or Data Radio Bearer (DRB);
the target MAC PDU should convey data from any Signalling Radio Bearer (SRB) or a predefined type of the SRB;
the target MAC PDU should be resulted from at least one specific previous uplink grant;
the target MAC PDU should have the longest storage time in the UE and/or the storage time of the target MAC PDU should be shorter or greater than a time threshold;
the target MAC PDU should comprise at least one MAC Control Element (CE) relating to a predefined type and/or having a predefined content; and the target MAC PDU should be stored in at least one predefined Hybrid Automatic Repeat Request (HARQ) process.

With such a set of criteria, it is possible to provide a proper selection of the target MAC PDU among the pending MAC PDUs and, consequently, to deliver required data included in the target MAC PDU more reliably and quickly.

In one example embodiment of the first aspect, the transceiver is configured to transmit the configuration information and the retransmission grant separately to the UE. The configuration information is transmitted prior to transmitting the retransmission grant. In another example embodiment of the first aspect, the transceiver is configured to include the configuration information in the retransmission grant and transmit the retransmission grant to the UE. By so doing, it is possible to make the network node according to the first aspect more flexible in use.

In one example embodiment of the first aspect, the processor is further configured to generate a control message for the UE. The control message indicates that one or more of the at least one criterion are no longer applicable, or one or more new criteria are to be used instead of one or more of the at least one criterion. Then, the processor causes the transceiver to transmit the control message to the UE. By so doing, it is possible to adjust the set of criteria, if required and depending on particular applications, thereby making the network node according to the first aspect more flexible in use.

In one example embodiment of the first aspect, the processor is further configured to indicate, in one of the configuration information, the retransmission grant and the control message, that the UE is allowed to apply the at least one criterion to a new MAC PDU if the pending MAC PDUs do not comprise the target MAC PDU. By so doing, it is possible to use the retransmission grant even when there is no target MAC PDU among the pending MAC PDUs. In other words, the UE may use the retransmission grant as a new transmission grant when none of the pending MAC PDUs satisfies the at least one criterion.

In one example embodiment of the first aspect, the transceiver is configured to transmit each of the configuration information, the retransmission grant and the control message as at least one of a Radio Resource Control (RRC) configuration message, Downlink Control Information (DCI) and a MAC CE. This may provide more flexibility-in-use of the network node according to the first aspect.

In one example embodiment of the first aspect, the processor is configured to generate the retransmission grant for the UE in response to beam failure or Listen-Before-Talk (LBT) failure detection in the wireless communication network and/or a request for the retransmission grant from the UE. This may allow the network node according to the first aspect to generate and transmit the retransmission grant to the UE more efficiently.

In one example embodiment of the first aspect, the transceiver is further configured to receive UE feedback from the UE. The UE feedback indicates at least one of the following: whether the pending MAC PDUs comprise the target MAC PDU (i.e. if one of the pending MAC PDUs satisfies the at least one criterion); and the target MAC PDU (and/or its HARQ Process Identifier (PID)) that has been selected and transmitted by using the radio resources. By using such UE feedback, the network node according to the first aspect may operate more efficiently.

In one example embodiment of the first aspect, the transceiver is configured to receive the UE feedback in Uplink Control Information (UCI) and/or a MAC CE through a Physical Uplink Shared Channel (PUSCH) and/or a Physical Uplink Control Channel (PUCCH). This may provide more flexibility-in-use of the network node according to the first aspect.

According to a second aspect, a UE for wireless communications is provided. The UE comprises a processor configured to generate MAC PDUs, a memory coupled to the processor and configured to store processor-executable instructions and those MAC PDUs whose uplink grants have been deprioritized in case of intra/inter-UE prioritization (for which reason these MAC PDUs become pending), and a transceiver coupled to the processor. The transceiver is configured to receive configuration information from a network node. The configuration information comprises at least one criterion for determining whether the pending MAC PDUs in the UE comprise a target MAC PDU. The transceiver is further configured to receive a retransmission grant from the network node. The retransmission grant comprises information regarding radio resources to be used by the UE to transmit the target MAC PDU. Being caused by the processor-executable instructions, the processor is further configured to determine, based on the at least one criterion, whether the pending MAC PDUs comprise the target MAC PDU. If the pending MAC PDUs comprise the target MAC PDU, the processor is configured to cause the transceiver to transmit the target MAC PDU by using the radio resources. By using the at least one criterion, the UE may properly determine which of the pending MAC PDUs stored in the UE (e.g., in a HARQ buffer) should be sent using the radio resources of the retransmission grant, thereby providing efficient MAC PDU recovery and resource usage.

In one example embodiment of the second aspect, the at least one criterion comprises at least one of the following:
the target MAC PDU should convey data with the highest or lowest priority;
the target MAC PDU should convey data with priority higher or lower than a priority threshold;
the target MAC PDU should convey data from an LCH having predefined parameters in certain value ranges;
the target MAC PDU should convey data from at least one predefined LCH or DRB;
the target MAC PDU should convey data from any SRB or a predefined type of the SRB;
the target MAC PDU should be resulted from at least one specific previous uplink grant;
the target MAC PDU should have the longest storage time in the UE and/or the storage time of the target MAC PDU should be shorter or greater than a time threshold;
the target MAC PDU should comprise at least one MAC CE relating to a predefined type and/or having a predefined content; and
the target MAC PDU should be stored in at least one predefined HARQ process.

With such a set of criteria, it is possible to provide a proper selection of the target MAC PDU among the pending MAC PDUs and, consequently, to deliver required data included in the target MAC PDU more reliably and quickly.

In one example embodiment of the second aspect, the transceiver is configured to receive the configuration information and the retransmission grant separately from the network node. The configuration information is received prior to receiving the retransmission grant. In another example embodiment of the second aspect, the transceiver is configured to receive the configuration information together with the retransmission grant. By so doing, it is possible to configure the UE according to the second aspect differently, thereby making the UE according to the second aspect more flexible in use.

In one example embodiment of the second aspect, the at least one criterion comprises a set of criteria. In this example embodiment, the transceiver is further configured to receive a control message from the network node. The control message indicates that one or more of the at least one criterion are no longer applicable, or one or more new criteria are to be used instead of one or more of the at least one criterion. By so doing, it is possible to adjust the set of criteria, if required and depending on particular applications, thereby making the UE according to the second aspect more flexible in use.

In one example embodiment of the second aspect, one of the configuration information, the retransmission grant and the control message further comprises an indication that the UE is allowed to apply the at least one criterion to a new MAC PDU if the pending MAC PDUs do not comprise the target MAC PDU. By so doing, it is possible to use the retransmission grant even when there is no target MAC PDU among the pending MAC PDUs. In other words, the UE may use the retransmission grant as a new transmission grant when none of the pending MAC PDUs satisfies the at least one criterion.

In one example embodiment of the second aspect, the transceiver is configured to receive each of the configuration information, the retransmission grant and the control message as at least one of an RRC configuration message, DCI and a MAC CE. This may provide more flexibility-in-use of the UE according to the second aspect.

In one example embodiment of the second aspect, the processor is further configured to generate a request for the retransmission grant and cause the transceiver to transmit the request to the network node. By so doing, the UE may receive the retransmission grant when it is required, thereby speeding up the recovery or retransmission of the target MAC PDU and, consequently, decreasing the delivery time of required data included in the target MAC PDU.

In one example embodiment of the second aspect, the processor is further configured to generate UE feedback. The UE feedback indicates at least one of the following: whether the pending MAC PDUs comprise the target MAC PDU; and the target MAC PDU (and/or its HARQ PID) that has been selected and transmitted by using the radio resources. The processor then causes the transceiver to transmit the UE feedback to the network node. By using such UE feedback, the network node may operate more efficiently.

In one example embodiment of the second aspect, the transceiver is configured to transmit the UE feedback in UCI and/or a MAC CE through a PUSCH and/or a PUCCH. This may provide more flexibility-in-use of the UE according to the second aspect.

According to a third aspect, a method for operating a network node in a wireless communication network is provided. The method starts with the step of generating configuration information for a UE in the wireless communication network. The configuration information comprises at least one criterion for determining whether pending MAC PDUs in the UE comprise a target MAC PDU. Then, the method proceeds to the step of generating a retransmission grant for the UE. The retransmission grant comprises information regarding radio resources to be used by the UE to transmit the target MAC PDU. The method further proceeds to the step of transmitting the configuration information and the retransmission grant to the UE. By using such configuration information, it is possible to configure the UE to use the at least one criterion in order to properly determine which of the pending MAC PDUs stored in the UE (e.g., in a HARQ buffer) should be sent using the radio resources of the retransmission grant, thereby providing efficient MAC PDU recovery and resource usage.

According to a fourth aspect, a method for operating a UE for wireless communications is provided. The method starts with the step of receiving configuration information from a network node. The configuration information comprises at least one criterion for determining whether pending MAC PDUs in the UE comprise a target MAC PDU. The method then proceeds to the step of receiving a retransmission grant from the network node. The retransmission grant comprises information regarding radio resources to be used by the UE to transmit the target MAC PDU. Next, the method goes on to the step of determining, based on the at least one criterion, whether the pending MAC PDUs comprise the target MAC PDU. If the MAC PDUs comprise the target MAC PDU, the method proceeds to the step of transmitting the target MAC PDU by using the radio resources. By using the at least one criterion, it is possible to properly determine which of the pending MAC PDUs stored in the UE (e.g., in a HARQ buffer) should be sent using the radio resources of the retransmission grant, thereby providing efficient MAC PDU recovery and resource usage.

According to fifth aspect, a network node in a wireless communication network is provided. The network node comprises a first means for generating configuration information for a UE in the wireless communication network. The configuration information comprises at least one criterion for determining whether pending MAC PDUs in the UE comprise a target MAC PDU. The network node further comprises a second means for generating a retransmission grant for the UE. The retransmission grant comprises information regarding radio resources to be used by the UE to transmit the target MAC PDU. The network node further comprises a means for transmitting the configuration information and the retransmission grant to the UE. By using such configuration information, the network node may configure the UE to use the at least one criterion in order to properly determine which of the pending MAC PDUs stored in the UE (e.g., in a HARQ buffer) should be sent using the radio resources of the retransmission grant, thereby providing efficient MAC PDU recovery and resource usage.

According to a sixth aspect, a UE for wireless communications is provided. The UE comprises a means for storing MAC PDUs that have become pending due to intra/inter-UE prioritization. The UE further comprises a first means for receiving configuration information from a network node. The configuration information comprises at least one criterion for determining whether the pending MAC PDUs in the UE comprise a target MAC PDU. The UE further comprises a second means for receiving a retransmission grant from the network node. The retransmission grant comprises information regarding radio resources to be used by the UE to transmit the target MAC PDU. The UE further comprises a means for determining, based on the at least one criterion, whether the pending MAC PDUs comprise the target MAC PDU. The UE further comprises a means for transmitting, if the pending MAC PDUs comprise the target MAC PDU, the target MAC PDU by using the radio resources. By using the at least one criterion, the UE may properly determine which of the pending MAC PDUs stored in the UE (e.g., in a HARQ buffer) should be sent using the radio resources of the retransmission grant, thereby providing efficient MAC PDU recovery and resource usage.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which.

DETAILED DESCRIPTION

Figure 1:
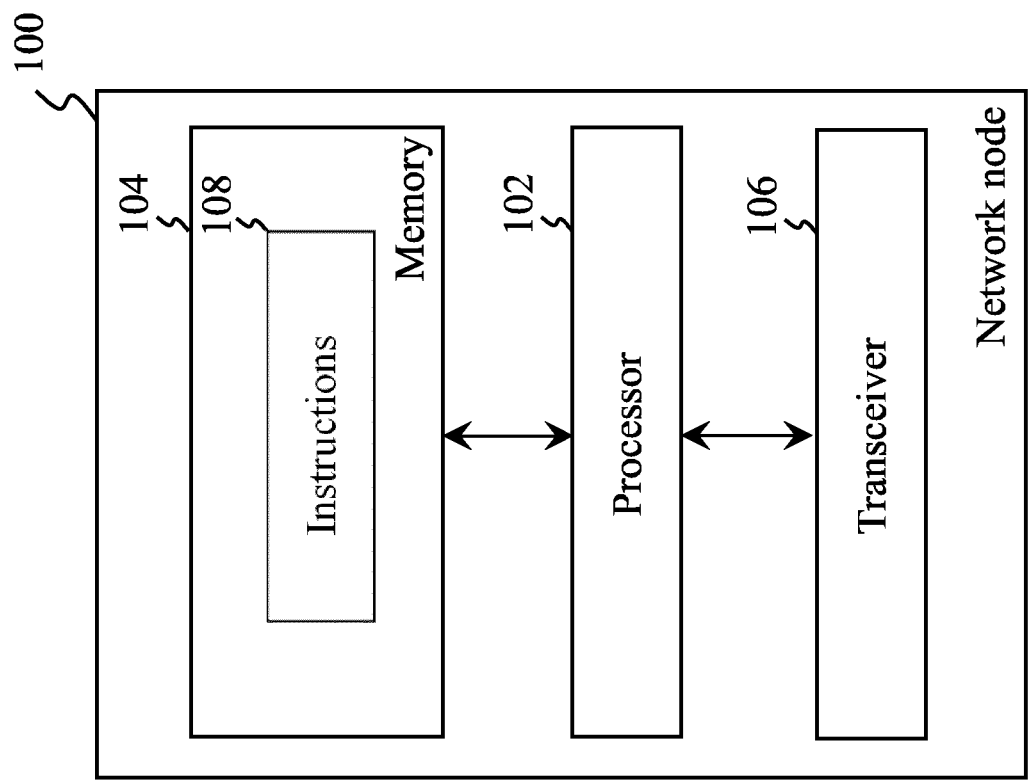
FIG. 1 shows a general block-scheme of a network node in accordance with one example embodiment.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a user equipment or UE for short may refer to a mobile device, a mobile station, a terminal, a subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical device or medical equipment, a biometric sensor, a wearable device (for example, a smart watch, smart glasses, a smart wrist band, etc.), an entertainment device (for example, an audio player, a video player, etc.), a vehicular component or sensor, a smart meter/sensor, an unmanned vehicle (e.g., an industrial robot, a quadcopter, etc.), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable device configured to support wireless communications. In some example embodiments, the UE may refer to at least two collocated and inter-connected UEs thus defined.

As used in the example embodiments disclosed herein, a network node may relate to a fixed point of communication for the UE in a particular wireless communication network. The network node may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

According to the example embodiments disclosed herein, a wireless communication network, in which the UE and the network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

The wireless communication network may be organized in accordance with a protocol stack, such, for example, as the one defined by the Open Systems Interconnection (OSI) reference model. In general, the protocol stack is a layered framework for organizing communications and network protocols. The protocol stack may be applied to a communication connection between the UE and the network node. One or more communication connections between the UE and network node may be conveyed by a communication channel established therebetween. Information in each communication connection is passed as a Data Unit (DU) from one protocol layer to the next, starting, for example, at the top with an application layer in the UE, proceeding down to the bottom at a physical layer, where the data unit is physically transmitted over a communications medium to another physical layer located at the network node. From there, the data unit is passed through all protocol layers up to the application layer that serves the network node (data units sent from the network node to the UE go through the same layers, but in the reverse order and through a different communication connection). Each protocol layer is responsible for performing specific tasks. At each protocol layer, the data unit has a specific form that is called a Protocol DU (PDU) for this protocol layer. For example, a PDU for a Media Access Control (MAC) layer (i.e. a protocol layer that provides control for accessing a transmission medium) is called a MAC PDU. One may consider a PDU as the form of the data unit that is exchanged between peer protocol layers located on the UE and the network node (e.g., two MAC layers on the UE and the network node).

Since the UE may use multiple communication services (e.g., different URLLC and eMBB services) in parallel, there may be multiple MAC PDUs concurrently generated in the UE, which are to be transmitted on different uplink (radio) resources allocated by the network node to the UE. Such allocation is done via an uplink grant issued by the network node to the UE. In general, the uplink grant may be considered as information regarding the radio resources and other transmission parameters allocated to the UE in order to transmit data. There are two types of the uplink grants, namely dynamic grants and configured grants. A dynamic grant is issued for a specific UE through a Physical Downlink Control Channel (PDCCH), and the network node transmits a UE identifier (ID) for the UE. Then, the UE determines whether its UE ID exists in the PDCCH, and thus may know whether the dynamic grant is transmitted for the UE. The UE ID may also be referred to as cell-radio network temporary identifier (C-RNTI). A configured grant is provided periodically and autonomously once configured, without the need to provide it dynamically. The UE may skip the radio resources of the configured grant if it has no data to transmit on the radio resources.

At the same time, there may be scenarios where at least two uplink grants for MAC PDUs have their radio resources overlapping or colliding in time, and/or scenarios where the radio resources of at least one uplink grant for a MAC PDU overlap, for example, with Physical Uplink Control Channel (PUCCH) resources for control signal information (e.g., a scheduling request) in time. In these scenarios, prioritization rules for the colliding resources should be defined to ensure that the MAC PDUs comprising more urgent data (e.g., relating to the URLLC services) are delivered more rapidly than the MAC PDUs comprising other (lower-priority) data (e.g., relating to the eMBB services). Given this, there will be at least one deprioritized uplink grant, i.e. the uplink grant corresponding to the lower-priority MAC PDU(s). According to the current state-of-the-art, depending on whether such a deprioritization decision is made before or after the corresponding MAC PDU is generated, there are two possible cases: (a) the MAC PDU of the deprioritized grant has already been generated and buffered in a corresponding HARQ buffer, or (b) the corresponding MAC PDU of the deprioritized grant has not been generated. In case (a), the MAC PDU becomes pending (i.e. waiting for its transmission) and could be recovered by a retransmission grant issued by the network node. In case (b), the MAC PDU will be not generated.

However, the network node may not be aware if the MAC PDU corresponding to the deprioritized uplink grant has already been generated or not. Thus, the network does not know whether to issue the retransmission grant (which is suitable if the corresponding MAC PDU has been generated) or a new transmission grant for any subsequent data. This issue is particularly relevant to cases where the deprioritized uplink grant is a Configured Grant (CG) resource, because the network node does not know if the UE has dropped this CG resource because it has no data, or if the MAC PDU has been generated but deprioritized, i.e. became pending.

Furthermore, the above-mentioned ambiguity on the network node side may lead to a resource wastage. For example, if the network node issues the retransmission grant but the corresponding MAC PDU has not been generated and stored in the corresponding HARQ buffer, the UE cannot use this retransmission grant since there is no pending MAC PDU in the HARQ buffer, i.e. the MAC PDU is not transmitted and the retransmission grant is wasted. It should be noted that the retransmission grant is currently dedicated for a specific HARQ Process ID (PID), i.e. the UE cannot use such a grant for a HARQ process different from the one indicated in DCI scheduling this grant.

To solve the problems above, one may use autonomous transmission of the pending MAC PDUs by the UE. More specifically, the UE may transmit the pending MAC PDU on a subsequent CG resource (associating to the same HARQ process) automatically, which may be modelled as a new transmission from the network node perspective. However, such autonomous retransmission does not always work well because:

the autonomous transmission on the subsequent CG resource may impose a delay to future data to arrive, especially for cases where the CG is dedicated to a periodic traffic stream;

the autonomous transmission is configured per CG configuration, which means such mechanism is not suitable for deprioritized CG resources belonging to the CG that has not been configured with the autonomous transmission; and the autonomous transmission is performed on a configured grant, which could be deprioritized by another dynamic grant (by default a dynamic grant should always be prioritized over a configured grant if they have overlapping resources).

To try to address the problems above, especially to avoid resource wastage, one other possible way may consist in the following: when the HARQ process of the retransmission grant corresponds to the empty HARQ buffer (i.e. no corresponding MAC PDU has been generated), the UE may instead use the retransmission grant for a new transmission. However, in cases where in fact there is a pending MAC PDU in one of the other HARQ buffers, this does not help in recovering the pending MAC PDU.

The example embodiments disclosed herein provide a technical solution that allows mitigating or even eliminating the above-sounded drawbacks peculiar to the prior art. In particular, the technical solution disclosed herein involves configuring a UE with at least one criterion for determining which of pending MAC PDUs stored in the UE (e.g., in HARQ buffers) could be transmitted by using radio resources of a retransmission grant issued by a network node. In other words, the UE should determine whether at least one of the pending MAC PDUs meets the at least one criterion. If none of the pending MAC PDUs meets the at least one criterion, it is also allowed to apply the at least one criterion to a new MAC PDU, thereby making it possible to use the retransmission grant issued by the network node as a new transmission grant (provided that the new MAC PDU meets the at least one criterion). Thus, by using such at least one criterion, it is possible to provide efficient MAC PDU recovery and resource usage.

FIG. 1 shows a general block-scheme of a network node 100 in accordance with one example embodiment. The network node 100 is intended to be deployed in any of the above-described wireless communication networks. As shown in FIG. 1, the network node 100 comprises a processor 102, a memory 104, and a transceiver 106. The memory 104 stores processor-executable instructions 108 which, when executed by the processor 102, cause the processor 102 to issue UE configuration information and a retransmission grant, as will be described below in more detail. It should be noted that the number, arrangement and interconnection of the constructive elements constituting the network node 100, which are shown in FIG. 1, are not intended to be any limitation of the present disclosure, but merely used to provide a general idea of how the constructive elements may be implemented within the network node 100. For example, the processor 102 may be replaced with several processors, as well as the memory 104 may be replaced with several removable and/or fixed storage devices, depending on particular applications. Furthermore, the transceiver 106 may be implemented as two individual devices, with one for a receiving operation and another for a transmitting operation. Irrespective of its implementation, the transceiver 106 is intended to be capable of performing different operations required to perform the data reception and transmission, such, for example, as signal modulation/demodulation, encoding/decoding, etc.

The processor 102 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 102 may be implemented as any combination of one or more of the aforesaid. As an example, the processor 102 may be a combination of two or more microprocessors.

The memory 104 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 108 stored in the memory 104 may be configured as a computer-executable code which causes the processor 102 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form and be generated by an interpreter (also pre-stored in the memory 104) on the fly.

Figure 2:
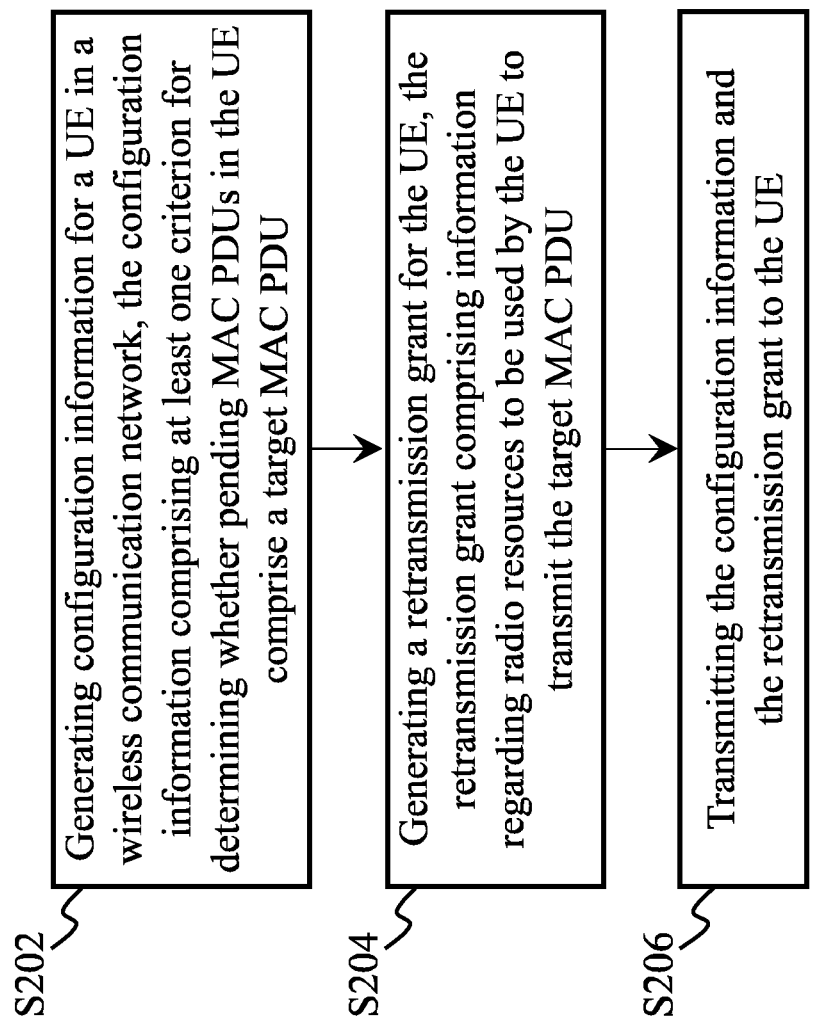
FIG. 2 shows a flowchart of a method for operating the network node shown in FIG. 1 in accordance with one example embodiment.

FIG. 2 shows a flowchart of a method 200 for operating the network node 100 in accordance with one example embodiment. In the method 200, the network node 100 is intended to communicate with a certain UE that stores pending (i.e. deprioritized in case of intra/inter-UE prioritization) MAC PDUs generated for different communication services (e.g., the URLLC and/or eMBB services). The method 200 starts with a step S202, in which the processor 102 generates configuration information for the UE, which comprises at least one criterion for determining whether the pending MAC PDUs in the UE comprise a target MAC PDU. The at least one criterion may comprise at least one of the following:

- the target MAC PDU should convey data with the highest or lowest priority (e.g., Logical Channel (LCH) priority);
- the target MAC PDU should convey data with priority higher or lower than a priority threshold;
- the target MAC PDU should convey data from an LCH having predefined parameters in specific value ranges (e.g., a LCH with a predefined Prioritized Bit Rate (PBR) or Bucket Size Duration (BSD) higher than X);
- the target MAC PDU should convey data from at least one specific LCH or Data Radio Bearer (DRB) (this could be realized by per-LCH configuration, i.e. if the LCH has a configuration information element with a certain field);
- the target MAC PDU should convey data from any Signalling Radio Bearer (SRB) or a predefined type of the SRB;
- the target MAC PDU should be resulted from at least one specific previous uplink grant;
- the target MAC PDU should have the longest storage time in the UE and/or the storage time of the target MAC PDU should be shorter or greater than a time threshold;
- the target MAC PDU should comprise at least one MAC Control Element (CE) relating to a predefined type and/or having a predefined content (e.g., a Buffer Status Report (BSR) MAC CE relating to URLLC traffics, or a MAC CE relating to beam failure recovery or Listen-Before-Talk (LBT) failure recovery); and
- the target MAC PDU should be stored in at least one predefined HARQ process.

Then, the method 200 proceeds to a step S204, in which the processor 102 generates a retransmission grant for the UE. The retransmission grant comprises information regarding the radio resources to be used by the UE to transmit the target MAC PDU. When the retransmission grant is generated, the method 200 goes on to a step S206, in which the processor 102 causes the transceiver 106 to transmit the configuration information and the retransmission grant to the UE. By using such configuration information, the network node 100 may configure the UE to use the at least one criterion in order to properly determine which of the pending MAC PDUs stored in the UE (e.g., in the HARQ buffer) should be sent using the radio resources of the retransmission grant, thereby providing efficient MAC PDU recovery and resource usage.

In one example embodiment, the UE may be pre-configured, for example, by a UE manufacturer to use an initial set of criteria by default for all pending MAC PDUs. Given this, the method 200, i.e. the configuration information, may be used by the network node 100 to adjust the initial set of criteria or even to replace the initial set of criteria with a new one.

In one example embodiment, the transceiver 106 is configured to transmit the configuration information and the retransmission grant separately to the UE in the step S206 of the method 200. In this case, the configuration information may be transmitted prior to transmitting the retransmission grant. In another example embodiment, the transceiver 106 is configured to include the configuration information in the retransmission grant and transmit the retransmission grant to the UE in the step S206 of the method 200. By so doing, it is possible to configure the UE differently, i.e. provide either per-grant configuration or pre-configuration of the UE.

In one example embodiment, the at least one criterion comprises a set of criteria (e.g., all of the above-listed possible criteria). In this example embodiment, the method 200 may comprise a further step (after the configuration information is transmitted to the UE), in which the processor 102 generates a control message indicating that one or more of the set of criteria are no longer applicable, or that one or more new criteria are to be used instead of one or more of the set of criteria. After that, the processor 102 causes the transceiver 106 to transmit the control message to the UE. By so doing, it is possible adjust the set of criteria even upon transmitting the configuration information, if required and depending on particular applications. It would be obvious to those skilled in the art that the network node 100 may transmit as many control messages as required. It should be also noted that, when the control message indicates that the whole set of criteria should be deactivated, i.e. become inapplicable, the UE may be configured to use the conventional method where the UE relies on the HARQ PID to know how the retransmission grant should be used.

In one example embodiment, the method 200 comprises a further step, in which the processor 102 indicates, in one of the configuration information, the retransmission grant and the control message, that the UE is allowed to apply the at least one criterion to a new MAC PDU if the pending MAC PDUs in the UE do not comprise the target MAC PDU (i.e. if none of the pending MAC PDUs satisfies the at least one criterion). By so doing, it is possible to use the retransmission grant even when there is no target MAC PDU among the pending MAC PDUs. In other words, the UE may use the retransmission grant as a new transmission grant when none of the pending MAC PDUs satisfies the at least one criterion and when, in turn, the new MAC PDU satisfies the at least one criterion.

It should be noted that the transceiver 106 may transmit each of the configuration information, the retransmission grant and the control message as at least one of an RRC configuration message, DCI and a MAC CE. For example, a new or existing field in the DCI may be used to indicate the applicable subset of criteria, or to indicate that the whole set of criteria indicated in the configuration information is still applicable at the moment for the retransmission grant. In some example embodiments, a new Radio Network Temporary Identifier (RNTI), DCI format and/or Control Resource Set (CORESET) ID may be used as ways to signal this information/indication.

In one example embodiment, the step S204 of the method 200 may be initiated in response to beam failure or LBT failure detection in the wireless communication network and/or a corresponding request for the retransmission grant from the UE. For example, when the network node 100 suspects the occurrence of beam failure (e.g., a continuous error in a FR2 carrier), it may issue such a retransmission grant to check if there is any Beam Failure Recovery Request MAC CE whose MAC PDU was actually stuck in one of the HARQ processes, in order to get this MAC CE more quickly. It should be noted that the UE may map any MAC CE to any grant depending on particular applications, for which reason the network node 100 has no idea where (which MAC PDU in which HARQ process) such MAC CE is conveyed, and the above-described traditional method of issuing the retransmission grant based on the HARQ PID may be a "wrong guess" that further delays the reception of desired information at the network node side.

Figure 3:
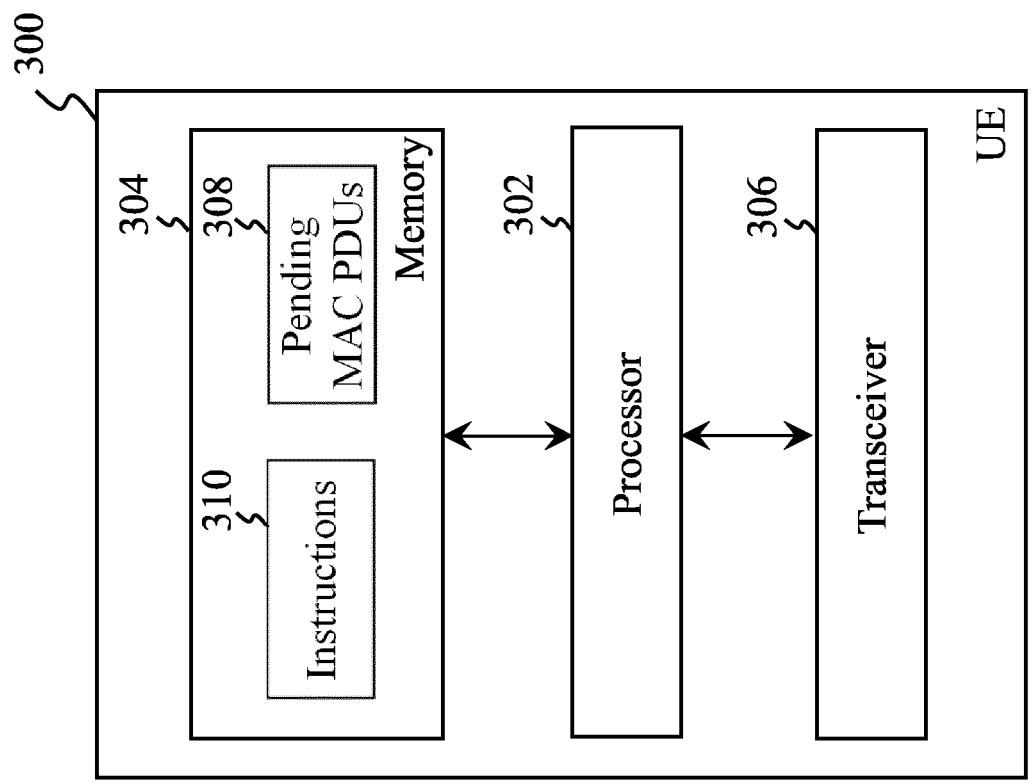
FIG. 3 shows a general block-scheme of a UE for wireless communications in accordance with one example embodiment.

FIG. 3 shows a general block-scheme of a UE 300 for wireless communications in accordance with one example embodiment. In particular, the UE 300 is intended to communicate with the network node 100 in any of the above-described wireless communication networks. As shown in FIG. 3, the UE 300 comprises a processor 302, a memory 304, and a transceiver 306. The memory 304 stores pending MAC PDUs 308 generated by the processor 302 for different communication services (e.g., the URLLC and/or eMBB services), as well as processor-executable instructions 310 which, when executed by the processor 302, cause the processor 302 to operate, as will be described below in more detail. It should be noted that the number, arrangement and interconnection of the constructive elements constituting the UE 300, which are shown in FIG. 3, are not intended to be any limitation of the present disclosure, but merely used to provide a general idea of how the constructive elements may be implemented within the UE 300. For example, the processor 302 may be replaced with several processors, as well as the memory 304 may be replaced with several removable and/or fixed storage devices, depending on particular applications. Furthermore, the transceiver 306 may be implemented as two individual devices, with one for a receiving operation and another for a transmitting operation. Irrespective of its implementation, the transceiver 306 is intended to be capable of performing different operations required to perform the data reception and transmission, such, for example, as signal modulation/demodulation, encoding/decoding, etc. In general, the processor 302, the memory 304 and the executable instructions 310 may be implemented in the same or similar manner as the processor 102, the memory 104 and the executable instructions 108, respectively, in the network node 100.

Figure 4:
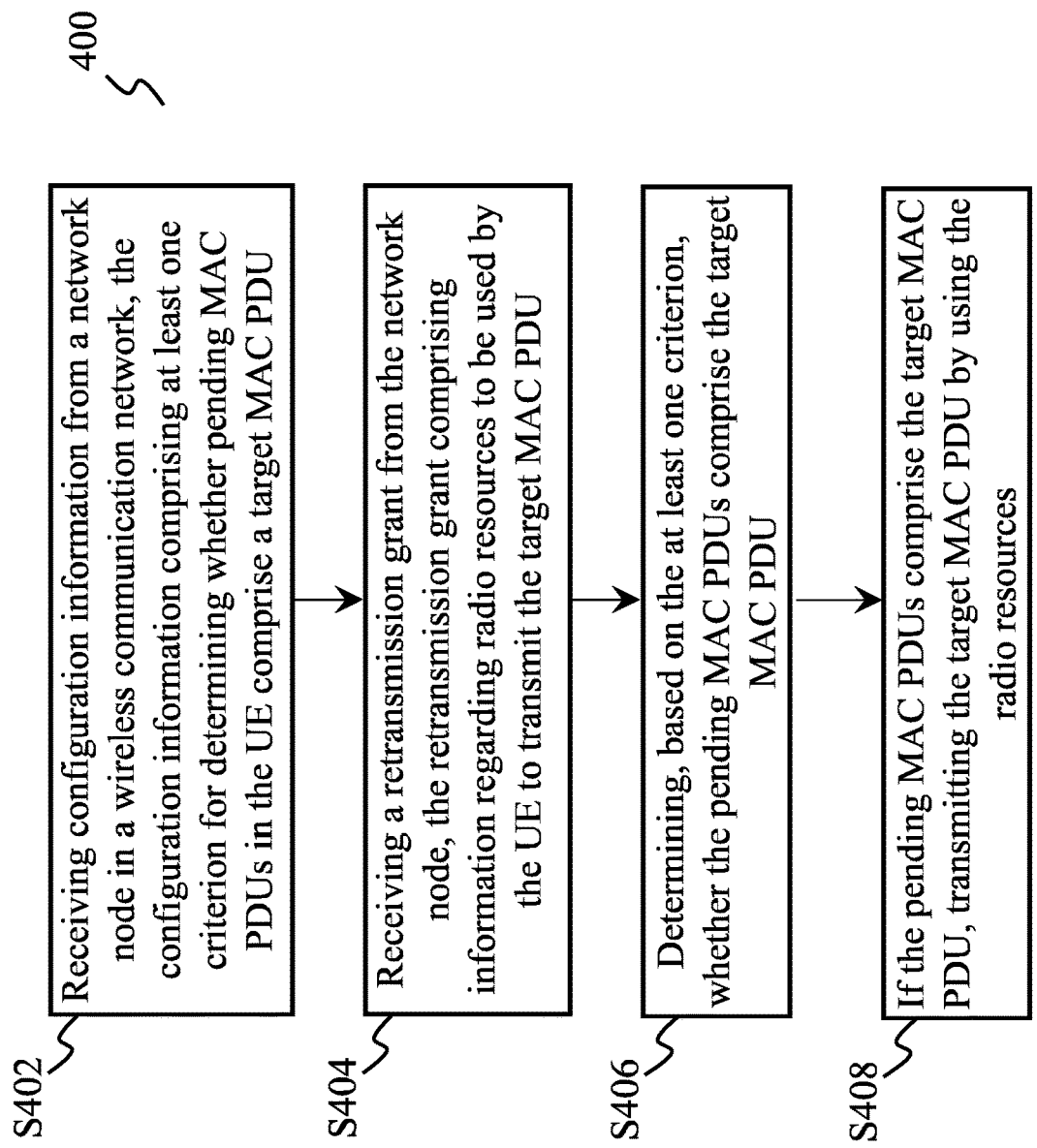
FIG. 4 shows a flowchart of a method for operating the UE shown in FIG. 3 in accordance with one example embodiment.

FIG. 4 shows a flowchart of a method 400 for operating the UE 300 in accordance with one example embodiment. The method 400 starts with a step S402, in which the transceiver 306 receives the configuration information from the network node 100, i.e. the transceiver 106. As noted above, the configuration information comprises one or more of the above-mentioned criteria for determining whether the pending MAC PDUs 308 stored in the memory 304 of the UE 300 comprise the target MAC PDU. The method 400 then proceeds to a step S404, in which the transceiver 306 receives the retransmission grant from the network node 100, i.e. the transceiver 106. The retransmission grant comprises the information regarding the uplink resources allocated to the UE 300 and used to transmit the target MAC PDU. Each of the configuration information and retransmission grant may be transmitted as at least one of an RRC configuration message, DCI and a MAC CE. It should be also noted that the steps S402 and S404 may be combined into one step, provided that the configuration information has been included in the retransmission grant on the network node side in the step S206 of the method 200. Next, the method 400 goes on to a step S406, in which the processor 302 uses the received configuration information to determine, based on said one or more criteria, whether the pending MAC PDUs 308 comprise the target MAC PDU. If the result of said determination is "Yes", i.e. the pending MAC PDUs 308 comprise the target MAC PDU, the method 400 proceeds to a step S408, in which the processor 302 causes the transceiver 306 to transmit the target MAC PDU (e.g., to the network node 100 or to any other UE) by using the radio resources of the retransmission grant. Thus, based on said one or more criteria, the UE 300 may properly determine which of the pending MAC PDUs 308 stored in the UE (e.g., in the HARQ buffer) should be sent using the radio resources of the retransmission grant, thereby providing efficient MAC PDU recovery and resource usage.

For example, the criteria indicated in the configuration information may cause the processor 302 of the UE 300 to determine, as the target MAC PDU, one of the pending MAC PDUs 308 which has:
 a transport block size matching the retransmission grant the best;
 a content (data or a MAC CE) with the highest priority; and
 the longest storage time in the HARQ buffer.

In one example embodiment, the method 400 comprises a further step, in which the transceiver 106 receives a control message from the network node 100 via at least one of an RRC configuration message, DCI and/or a MAC CE. The control message may indicate that one or more of the criteria indicated in the configuration information are no longer application, i.e. should not be used by the processor 302 in the step S406. The control message may also indicate that one or more new criteria should be used by the processor 302 in the step S406 instead of one or more of the criteria previously indicated in the configuration information. The control may also indicate that the processor 302 is allowed to apply the criteria received in the step S402 to a new MAC PDU if none of the pending MAC PDUs currently stored in the memory 304 satisfies the criteria.

In one example embodiment, the method 400 comprises a further step, before the step S404, in which the processor 302 generates a request for the retransmission grant and causes the transceiver 306 to transmit the request to the network node 100. By so doing, the UE 300 may receive the retransmission grant when it is required, thereby speeding up the recovery or retransmission of the target MAC PDU and, consequently, decreasing the delivery time of required data included in the target MAC PDU.

In one example embodiment, the method 400 comprises a further step, in which the processor 302 generates UE feedback. The UE feedback indicates at least one of the following: whether the pending MAC PDUs 308 comprise the target MAC PDU; and the target MAC PDU that has been selected and transmitted by using the radio resources of the retransmission grant. The processor 302 then causes the transceiver 306 to transmit the UE feedback to the network node 100. The transceiver 306 may transmit the UE feedback in Uplink Control Information (UCI) and/or a MAC CE through a Physical Uplink Shared Channel (PUSCH) and/or a Physical Uplink Control Channel (PUCCH).

Figure 5:
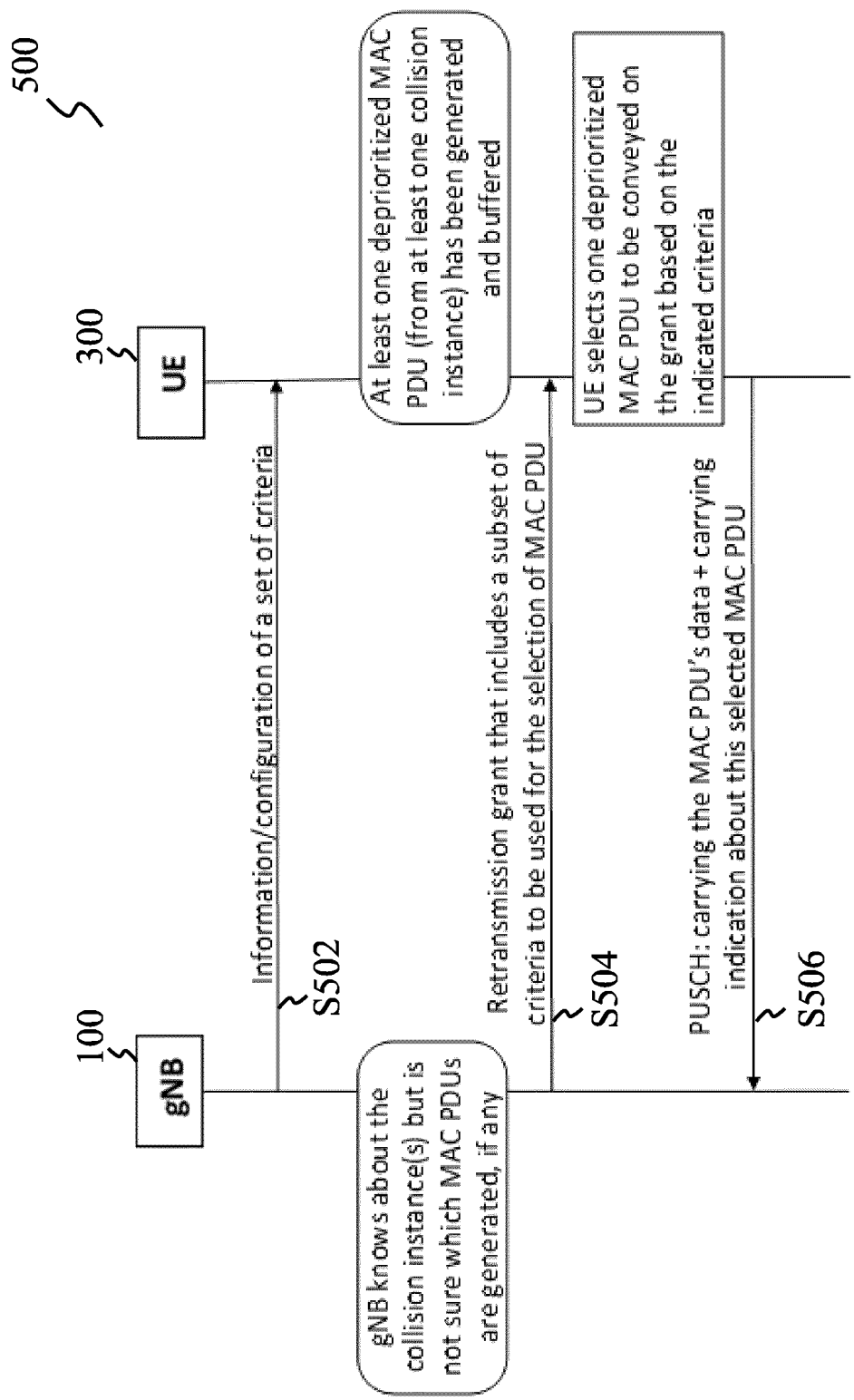
FIG. 5 shows an interaction diagram that explains the interactive behavior of the network node shown in FIG. 1 and the UE show in FIG. 3 in accordance with one example embodiment.

FIG. 5 shows an interaction diagram 500 that explains the interactive behavior of the network node 100 and the UE 300 in accordance with one example embodiment. In this example embodiment, the network node 100 is represented by a gNB, thereby meaning that the interaction between the network node 100 and the UE 300 is provided via the 5G NR communication technology. The interaction diagram 500 starts with a step S502, in which the gNB 100 configures (e.g., via Radio Resource Control (RRC) signalling) a certain set of criteria relating to pending-MAC PDU selection in the UE 300. It may be done by using a mapping between a codepoint of a certain (new or existing) field in the DCI and subsets of criteria. For example, assuming such a DCI field for criteria subset indication has 2 bits, the gNB 100 may configure the following mapping:
 00: The pending MAC PDU to be selected for transmission should convey data with the highest LCH priority;
 01: The pending MAC PDU to be selected for transmission should be resulted from CG configurations with indices 2 and 4;
 10: The pending MAC PDU to be selected for transmission should contain a BSR; and
 11: The pending MAC PDU to be selected for transmission should be stored in the HARQ buffer of HARQ PID 3, 7, 10, and 13.

Then, in cases of possible intra/inter-UE prioritization, i.e., for example, when the radio resources of two uplink grants issued by the gNB 100 overlap or collide in time, the gNB 100 issues, in a next step S504, a retransmission grant with an indication relating to a subset of criteria (i.e. the gNB 100 includes the configuration information in the retransmission grant before its transmission to the UE 300). For example, by using the 2-bits field in the DCI that schedules the retransmission grant, the UE 300 may select one of the pending MAC PDUs (i.e. a target MAC PDU) to be transmitted accordingly. In one example, the gNB 100 may determine whether such a retransmission grant should be issued based on some information relating to the pending MAC PDUs provided by the UE 300.

Once the target MAC PDU is selected for transmission, the UE 300 further embeds certain UCI in the PUSCH, which indicates certain information relating to the selected target MAC PDU, such as the HARQ PID of the HARQ buffer where it has been stored. After that, the UE 300 transmits the target MAC PDU together with the UCI to the gNB 100 in a next step S506. It should be noted that such UCI may be extended from the Autonomous Uplink (AUL) UCI (AUL-UCI) mechanism that has been defined in the 3rd Generation Partnership Project (3GPP) for unlicensed band operation.

Figure 6:
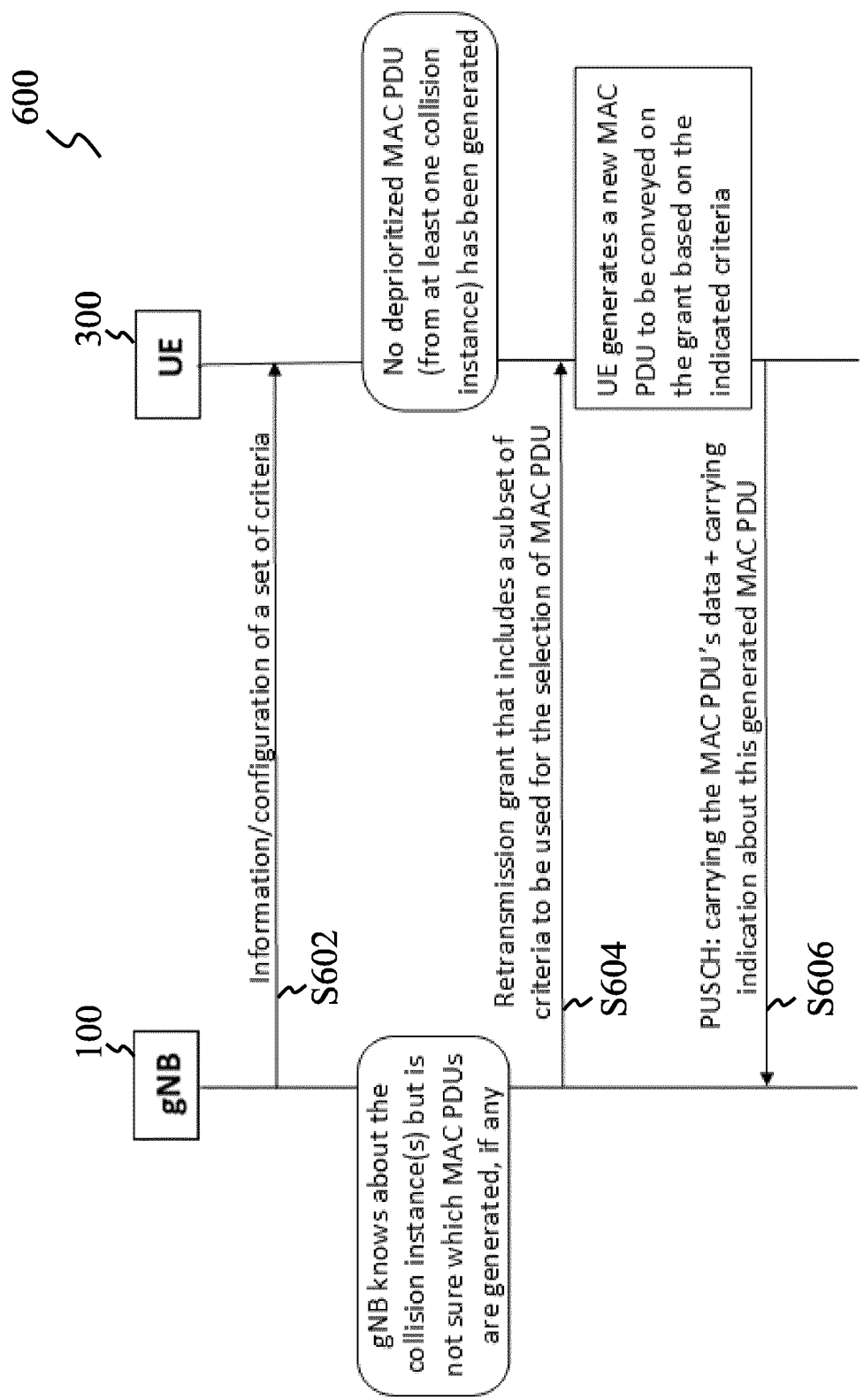
FIG. 6 shows an interaction diagram that explains the interactive behavior of the network node shown in FIG. 1 and the UE show in FIG. 3 in accordance with another example embodiment.

FIG. 6 shows an interaction diagram 600 that explains the interactive behavior of the network node 100 and the UE 300 in accordance with another example embodiment. In this example embodiment, the network node 100 is again represented by a gNB, thereby meaning that the interaction between the network node 100 and the UE 300 is provided via the 5G NR communication technology. The interaction diagram 600 starts with a step S602, in which the gNB 100 configures (e.g., via Radio Resource Control (RRC) signalling) a certain set of criteria relating to pending-MAC PDU selection in the UE 300. The set of criteria may be signalled to the UE 300 in the same way as discussed above with reference to the interaction diagram 500. Further, in cases of possible intra/inter-UE prioritization, the gNB 100 issues, in a next step S604, a retransmission grant with an indication relating to a subset of criteria to be used by the UE 300 to determine which of the pending MAC PDUs should be transmitted next. However, contrary to the interaction diagram 500, in this case there is no pending MAC PDU that satisfies the criteria indicated in the retransmission grant (i.e. no target MAC PDU). Thus, the UE 300 uses the retransmission grant for a new transmission. The UE 300 embeds certain UCI in the PUSCH, which indicates some information relating to the fact that the new transmission is performed using this retransmission grant, i.e. a new MAC PDU is generated. The new MAC PDU and the UCI are then transmitted by the UE 300 to the gNB 100 in a next step S606.

It should be noted that each step or operation of the methods 200, 400 and the interaction diagrams 500, 600, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 102 and 302. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network node in a wireless communication network, comprising: a processor;
a memory coupled to the processor and configured to store processor-executable instructions; and
a transceiver coupled to the processor;
wherein the processor is configured, when executing the processor-executable instructions, to:
generate configuration information for a user equipment (UE) in the wireless communication network, the configuration information comprising at least one criterion for determining whether pending Media Access Control (MAC) Protocol Data Units (PDUs) in the UE comprise a target MAC PDU;
generate a retransmission grant for the UE, the retransmission grant comprising information regarding radio resources to be used by the UE to transmit the target MAC PDU; and
cause the transceiver to transmit the configuration information and the retransmission grant to the UE,
wherein the processor is configured to generate a control message when one or more of the set of criteria are no longer applicable, or that one or more new criteria are to be used instead of the at least one criterion and causes the transceiver to transmit the control message to the UE,
wherein the processor is further configured to:
receive UE feedback indicating the following:
whether the pending MAC PDUs comprise the target MAC PDU; and the target MAC PDU that has been selected and transmitted by using the radio resources; and
wherein the UE feedback is received in Uplink Control Information (UCI) and a MAC CE through a Physical Uplink Shared Channel (PUSCH) and a Physical Uplink Control Channel (PUCCH).

2. The network node according to claim 1, wherein the at least one criterion comprises the following:

the target MAC PDU conveys data with a high or a low priority;
the target MAC PDU conveys data with priority higher or lower than a priority threshold;
the target MAC PDU conveys data from a Logical Channel (LCH) having predefined parameters;
the target MAC PDU conveys data from at least one predefined LCH or Data Radio Bearer (DRB);
the target MAC PDU conveys data from any Signalling Radio Bearer (SRB) or a predefined type of the SRB;
the target MAC PDU is a result from at least one specific previous uplink grant;
the target MAC PDU has a maximum storage time in the UE and the storage time of the target MAC PDU is less or greater than a time threshold;
the target MAC PDU comprises at least one MAC Control Element (CE) relating to a predefined type and having a predefined content;
and the target MAC PDU is stored in at least one predefined Hybrid Automatic Repeat Request (HARQ) process.

3. A user equipment (UE) for wireless communications, comprising: a processor;
a memory coupled to the processor and configured to store processor-executable instructions and pending Media Access Control (MAC) Protocol Data Units (PDUs); and a transceiver coupled to the processor and configured to:
receive configuration information from a network node, the configuration information comprising at least one criterion for determining whether the pending MAC PDUs in the UE comprise a target MAC PDU; and
receive a retransmission grant from the network node, the retransmission grant comprising information regarding radio resources to be used by the UE to transmit the target MAC PDU;
wherein the processor is configured, when executing the processor-executable instructions, to:
based on the at least one criterion, determine whether the pending MAC PDUs comprise the target MAC PDU; and
if the pending MAC PDUs comprise the target MAC PDU, cause the transceiver to transmit the target MAC PDU by using the radio resources,
wherein the at least one criterion indicated in the configuration information causes the processor to determine, as the target MAC PDU, one of the pending MAC PDUs which has:
a transport block size matching the retransmission grant the best;
a content data or a MAC CE with the highest priority; and
the longest storage time in a HARQ buffer,
wherein the processor is further configured to:
generate UE feedback indicating the following:
whether the pending MAC PDUs comprise the target MAC PDU; and the target MAC PDU that has been selected and transmitted by using the radio resources; and
cause the transceiver to transmit the UE feedback to the network node,
wherein the transceiver is configured to transmit the UE feedback in Uplink Control Information (UCI) and a MAC CE through a Physical Uplink Shared Channel (PUSCH) and a Physical Uplink Control Channel (PUCCH).

4. The UE according to claim 3, wherein the at least one criterion comprises the following:
- the target MAC PDU conveys data with a high or a low priority;
- the target MAC PDU conveys data with priority higher or lower than a priority threshold;
- the target MAC PDU conveys data from a Logical Channel (LCH) having predefined parameters;
- the target MAC PDU conveys data from at least one predefined LCH or Data Radio Bearer (DRB);
- the target MAC PDU conveys data from any Signalling Radio Bearer (SRB) or a predefined type of the SRB;
- the target MAC PDU is a result from at least one specific previous uplink grant;
- the target MAC PDU has a maximum storage time in the UE and the storage time of the target MAC PDU is less than or greater than a time threshold;
- the target MAC PDU should comprise at least one MAC Control Element (CE) relating to a predefined type and having a predefined content; and
- the target MAC PDU is stored in at least one predefined Hybrid Automatic Repeat Request (HARQ) process.

5. The UE according to claim 3, wherein the transceiver is configured to receive the configuration information and the retransmission grant separately from the network node, the configuration information being received prior to receiving the retransmission grant.

6. The UE according to claim 3, wherein the transceiver is configured to receive the configuration information together with the retransmission grant from the network node.

7. The UE according to claim 3, wherein the transceiver is further configured to receive a control message from the network node, the control message indicating the following: that one or more of the at least one criterion are no longer applicable, that one or more new criteria are to be used instead of one or more of the at least one criterion, and that the processor is allowed to apply the criteria received to a new MAC PDU if none of the pending MAC PDUs currently stored in the memory satisfies the criteria, and wherein the processor is configured to perform said determining based on the control message.

8. The UE according to claim 7, wherein the control message further comprises an indication that the UE is allowed to apply the at least one criterion to a new MAC PDU if the pending MAC PDUs do not comprise the target MAC PDU.

9. The UE according to claim 7, wherein the transceiver is configured to receive each of the configuration information, the retransmission grant and the control message as a Radio Resource Control (RRC) configuration message, Downlink Control Information (DCI) and a MAC CE.

10. The UE according to claim 3, wherein one of the configuration information and retransmission grant further comprises an indication that the UE is allowed to apply the at least one criterion to a new MAC PDU if the pending MAC PDUs do not comprise the target MAC PDU.

11. The UE according to claim 3, wherein the processor is further configured to generate a request for the retransmission grant and cause the transceiver to transmit the request to the network node.

12. A method for operating a UE for wireless communications, comprising:
- receiving configuration information from a network node, the configuration information comprising at least one criterion for determining whether pending Media Access Control (MAC) Protocol Data Units (PDUs) in the UE comprise a target MAC PDU;
- receiving a retransmission grant from the network node, the retransmission grant comprising information regarding radio resources to be used by the UE to transmit the target MAC PDU;
- based on the at least one criterion, determining whether the pending MAC PDUs comprise the target MAC PDU; and
- if the pending MAC PDUs comprise the target MAC PDU, transmitting the target MAC PDU by using the radio resources,
- wherein the method further comprises, based on the at least one criteria indicated in the configuration information, determining, as the target MAC PDU, one of the pending MAC PDUs which has:
  - a transport block size matching the retransmission grant the best;
  - a content data or a MAC CE with the highest priority; and
  - the longest storage time in the HARQ buffer,
- wherein the method further comprises:
- generating UE feedback indicating the following:
- whether the pending MAC PDUs comprise the target MAC PDU; and the target MAC PDU that has been selected and transmitted by using the radio resources; and
- causing the transceiver to transmit the UE feedback to the network node,
- wherein the transceiver is configured to transmit the UE feedback in Uplink Control Information (UCI) and a MAC CE through a Physical Uplink Shared Channel (PUSCH) and a Physical Uplink Control Channel (PUCCH).

* * * * *